United States Patent
Takahashi et al.

(10) Patent No.: US 11,750,049 B2
(45) Date of Patent: Sep. 5, 2023

(54) ROTATING ELECTRICAL MACHINE

(71) Applicant: HONDA MOTOR CO., LTD., Tokyo (JP)

(72) Inventors: Hiroya Takahashi, Wako (JP); Takafumi Kotani, Wako (JP); Kana Miyagi, Wako (JP); Wataru Matsuyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 57 days.

(21) Appl. No.: 17/484,154

(22) Filed: Sep. 24, 2021

(65) Prior Publication Data

US 2022/0131432 A1 Apr. 28, 2022

(30) Foreign Application Priority Data

Oct. 23, 2020 (JP) .................................. 2020-178057

(51) Int. Cl.
| | |
|---|---|
| H02K 1/27 | (2022.01) |
| H02K 1/278 | (2022.01) |
| H02K 15/03 | (2006.01) |
| H02K 1/02 | (2006.01) |

(52) U.S. Cl.
CPC ............... H02K 1/278 (2013.01); H02K 1/02 (2013.01); H02K 15/03 (2013.01)

(58) Field of Classification Search
CPC .......... H02K 1/278; H02K 1/02; H02K 15/03
See application file for complete search history.

(56) References Cited

U.S. PATENT DOCUMENTS

| | | | |
|---|---|---|---|
| 2006/0053577 A1* | 3/2006 | Moein | H02K 21/22 310/67 R |
| 2014/0084731 A1* | 3/2014 | Iwami | H02K 1/02 310/156.07 |
| 2015/0061472 A1* | 3/2015 | Leng | H02K 1/02 310/68 D |
| 2020/0336031 A1* | 10/2020 | Takahashi | H02K 1/2773 |

FOREIGN PATENT DOCUMENTS

JP 2018-026985 2/2018

* cited by examiner

*Primary Examiner* — Thomas Truong
(74) *Attorney, Agent, or Firm* — Rankin, Hill & Clark LLP

(57) ABSTRACT

A rotor has an opposing surface opposed to a stator, the opposing surface has flat surfaces extending in a tangential direction of a circle centered on an axial center of the rotor at a predetermined angular interval centered on the axial center, and a magnet is disposed on this flat surface.

4 Claims, 5 Drawing Sheets

ROTATING ELECTRICAL MACHINE

INCORPORATION BY REFERENCE

The present application claims priority under 35 U.S.C. § 119 to Japanese Patent Application No. 2020-178057 filed on Oct. 23, 2020. The content of the application is incorporated herein by reference in its entirety.

BACKGROUND

Technical Field

The present invention relates to a rotating electrical machine.

Related Art

A rotating electrical machine including a stator in which a coil is disposed and a rotor rotatable with respect to the stator is known. Generally, in this type of rotating electrical machine, permanent magnets having a tile shape (also referred to as a plate shape along an arc) are arranged in a circumferential direction on an inner peripheral surface of a rotor yoke constituting a part of a rotor so that S poles and N poles are alternately switched (see, for example, JP 2018-026985 A). In the configuration of JP 2018-026985 A, ferrite magnets are used as the permanent magnets.

SUMMARY

When further improvement of the power generation performance of the rotating electrical machine is required, it is conceivable to use rare earth-based sintered magnets having a high magnetic force such as neodymium magnets.

However, the neodymium magnet having a particularly high magnetic force is not distributed in a tile shape, and needs to be cut into a tile shape, which is disadvantageous not only for cost reduction but also for effective utilization of resources due to generation of swarf of neodymium as a rare earth. In addition, when processing is required, the probability that a defective product will occur increases.

Therefore, an object of the present invention is to easily dispose a rare earth-based sintered magnet without processing the rare earth-based sintered magnet into a tile shape.

In order to achieve the above object, there is provided a rotating electrical machine including: a stator in which a coil is disposed; and a rotor rotatable with respect to the stator, in which the rotor has an opposing surface opposed to the stator, the opposing surface has flat surfaces extending in a tangential direction of a circle centered on an axial center of the rotor at a predetermined angular interval centered on the axial center, and rare earth-based sintered magnets are disposed on the flat surfaces.

In the above configuration, the rotor may have a polygonal surface opposed to the stator and centered on the axial center of the rotor, and the sintered magnets may be disposed on the surface.

In the above configuration, the sintered magnets may be neodymium magnets having a rectangular plate shape.

In the above configuration, a positioning member made of resin which is capable of positioning the sintered magnet may be provided on the opposing surface.

In the above configuration, the sintered magnets arranged at a predetermined angular interval on the opposing surface may each include a plurality of magnet members arranged in a rotation direction of the rotor in a state of being in contact with each other, and the plurality of magnet members may have magnetic flux densities decreased toward both ends in a rotation direction of the rotor.

In the above configuration, a rotor core of the rotor and a stator core of the stator may be formed by laminating a plurality of electromagnetic steel sheets.

According to the present invention, the rare earth-based sintered magnet can be easily disposed without being processed into a tile shape.

DETAILED DESCRIPTION

An embodiment of the present invention will be described below with reference to the drawings.

Figure 1:
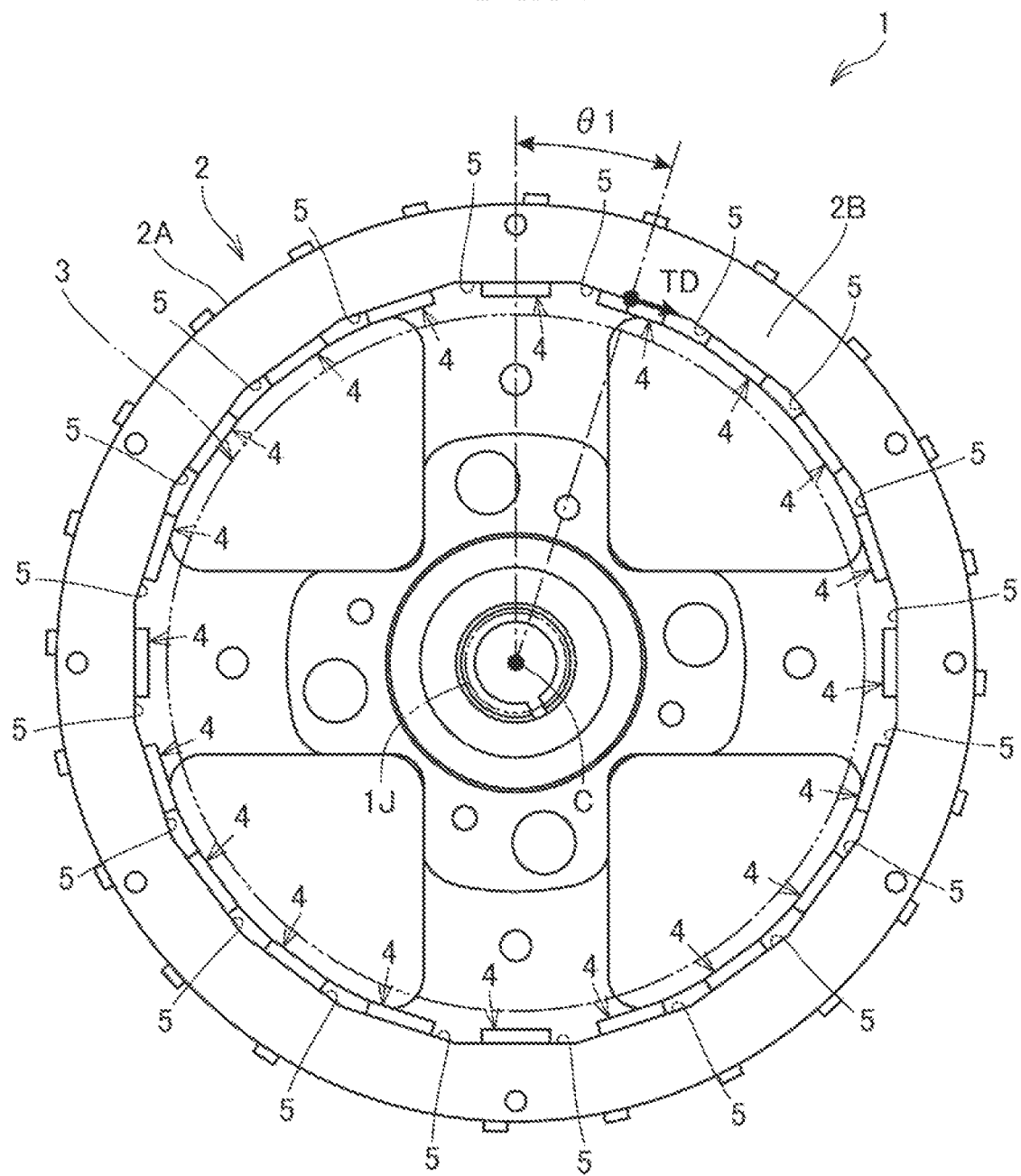
FIG. 1 is a diagram illustrating a main part of an alternator according to an embodiment of the present invention.

FIG. 1 is a diagram illustrating a main part of an alternator 1 according to the embodiment of the present invention.

The alternator 1 is an outer rotor type rotating machine in which a stator 3 is disposed on an inner periphery of a rotor 2 that rotates integrally with an output shaft 1J of an engine or the like, and is also referred to as an AC type rotating electrical machine. In FIG. 1, the center of the output shaft 1J is denoted by reference numeral C, and the stator 3 is indicated by an imaginary line.

The alternator 1 is used, for example, in an engine generator. In the alternator 1, sintered magnets having better magnetic characteristics than ferrite magnets are used, and power generation performance can be improved and downsizing can be achieved as compared with a case where the ferrite magnets are used.

The rotating electrical machine structure applied to the alternator 1 may be applied to various power generation sources in the power generator field, or may be applied to devices other than the power generator. For example, the rotating electrical machine structure of the present embodiment may be applied to either a power generation source in the vehicle field or a power source in the vehicle field, or may be applied to a power generation source and a power source used in other fields other than the vehicle field.

Before the rotor 2 is described, the stator 3 will be described.

Figure 2:
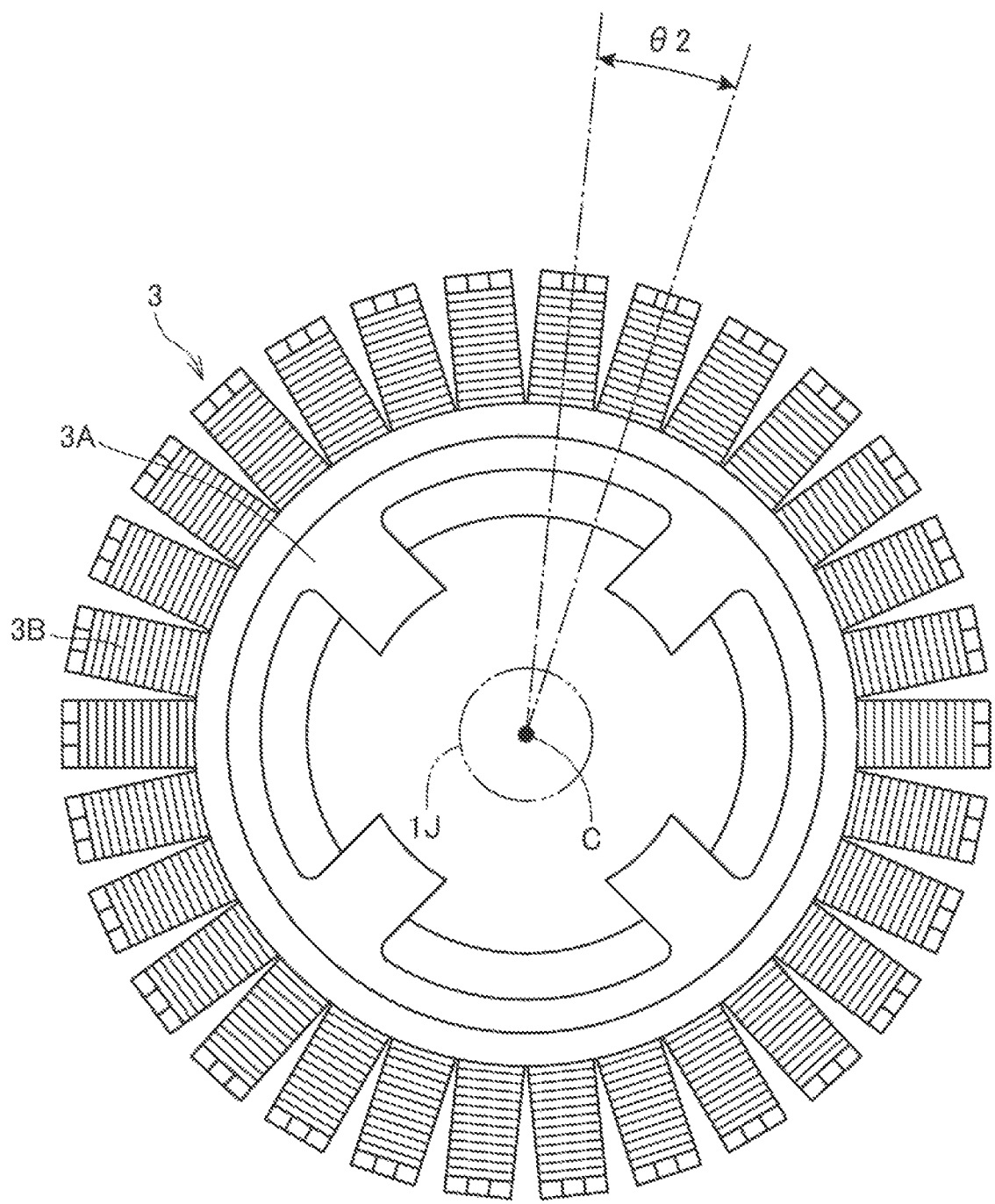
FIG. 2 is a diagram illustrating an example of a stator.

FIG. 2 illustrates an example of the stator 3.

The stator 3 is disposed relatively rotatably and coaxially with the output shaft 1J of the engine. The stator 3 includes a stator core 3A having a substantially cylindrical shape, and slots 3B provided at an interval of an angle θ2 (12 degrees in the present embodiment) along the circumferential direction of the stator 3, and a coil is attached to each slot 3B. The stator core 3A is manufactured by laminating electromagnetic steel sheets in the axial direction.

FIG. 2 illustrates a case where the number of slots of the stator 3 is a value of 30, but the number of slots, the shape of each portion of the stator 3, and the like may be appropriately changed. In the present description, the circumferential direction corresponds to the circumferential direction of the output shaft 1J, and is also the circumferential direction of the stator 3, the circumferential direction of the rotor 2, and the circumferential direction of the alternator 1. The center C of the output shaft 1J coincides with the axial center of the stator 3, the axial center of the rotor 2, and the rotation center of the rotor 2, and is appropriately denoted as the axial center C in the following description.

As illustrated in FIG. 1, the rotor 2 includes a rotor core 2A having an annular portion (annular portion 2B to be described later) along the outer periphery of the stator 3, and magnets 4 arranged at an interval of an angle θ1 (18 degrees in the present embodiment) along the circumferential direction of the rotor 2. The value of the angle θ1 and the like may be changed as appropriate. Similarly to the stator core 3A, the rotor core 2A is also manufactured by laminating electromagnetic steel sheets in the axial direction.

The rotor core 2A and the stator core 3A of the present embodiment are manufactured by simultaneously punching components having respective cross-sectional shapes of the rotor core 2A and the stator core 3A from the same electromagnetic steel sheet and laminating a plurality of the punched components.

By simultaneously punching the components to be the rotor core 2A and the stator core 3A from the same electromagnetic steel sheet, the dimensional relationship between the rotor core 2A and the stator core 3A and the shape of each portion can be easily manufactured with high accuracy, which is advantageous for defect rate reduction. In addition, by changing the punching shape, the shapes of the rotor core 2A and the stator core 3A can be changed, and it becomes easy to cope with design change.

In addition, since the electromagnetic steel sheet is used, the amount of heat generated by the rotor 2 and the stator 3 can be easily reduced as compared with the case where the electromagnetic steel sheet is not used.

The rotor core 2A includes an annular portion 2B extending endlessly along the circumferential direction with reference to the axial center C of the rotor 2, and an inner peripheral surface of the annular portion 2B is an opposing surface 5 opposed to the stator 3, more specifically, an opposing surface 5 opposed to the coil.

The opposing surface 5 is formed in a polygonal flat surface (20 angular flat surface in the present embodiment) centered on the axial center C of the rotor 2, and reference numeral 5 is indicated for each flat surface in FIG. 1.

More specifically, the opposing surface 5 is formed in flat surfaces extending in a tangential direction (indicated by reference numeral TD in FIG. 1) of a circle centered on the axial center C at an interval of the angle θ1 centered on the axial center C of the rotor 2. This flat surface can also be referred to as a planar surface and a non-curved surface.

The magnet 4 is disposed on each flat surface, and N poles and S poles of the magnets 4 are alternately arranged in the circumferential direction of the rotor 2. The magnets 4 form magnetic pole portions (also referred to as rotor magnetic poles) at intervals in the circumferential direction of the rotor 2, and in the present embodiment, twenty magnetic pole portions are formed. FIG. 1 does not disclose a configuration in which the magnet 4 is attached to the rotor 2, and this configuration will be described later.

As the magnet 4, a rare earth sintered magnet is used, and more specifically, a neodymium magnet is used. Neodymium is a metal element of atomic number 60. The neodymium magnet is a rare earth magnet containing neodymium, iron, and boron as main components, and has a residual magnetic flux density, a coercive force, and a maximum energy product superior to those of a ferrite magnet (ferritic sintered magnet) and the like. A rare earth sintered magnet other than the neodymium magnet may be used, and for example, a samarium cobalt magnet may be used.

Incidentally, a specific magnet such as the neodymium magnet is not distributed in a tile shape that is a plate shape along an arc, and it is necessary to cut the magnet into a tile shape in order to dispose the magnet on the inner peripheral surface along the arc of the conventional rotor core. When cutting is performed, it is disadvantageous not only for cost reduction and a defect rate reduction, but also for effective utilization of resources due to generation of swarf.

As described above, in the present embodiment, since the opposing surface 5 opposed to the stator 3 is formed in a flat surface (planar surface, non-curved surface) (see FIG. 1), the neodymium magnet can be arranged on the flat surface only by cutting into a rectangular plate shape (also referred to as a rectangular parallelepiped shape), which minimizes processing from a block material in a distribution form of the neodymium magnet.

Moreover, since the opposing surface 5 is flat surfaces extending in the tangential direction of the circle centered on the axial center C at an interval of the angle θ1 centered on the axial center C of the rotor 2, the positional relationship (separation distance or the like) between the magnet 4 and the coil can be easily made appropriate, and desired power generation performance can be easily obtained.

Examples of the configuration in which the magnet 4 is attached to the flat opposing surface 5 include a "configuration using a positioning member" and a "configuration not using a positioning member".

The "configuration not using a positioning member" is a method of joining the magnet 4 and the opposing surface 5 using a predetermined adhesive or a known joining method other than adhesion. In this case, a stepped portion (for example, a concave portion in which the magnet 4 is accommodated or a convex portion on which the magnet 4 abuts) for positioning the magnet 4 may be provided on the opposing surface 5.

In the present embodiment, since the rotor core 2A having the opposing surface 5 is manufactured by punching an electromagnetic steel sheet, the electromagnetic steel sheet may be punched so as to integrally have step portions for positioning, and it is easy to manufacture the rotor core 2A capable of positioning the magnets 4.

Next, the "configuration using a positioning member" will be described.

Figure 3:
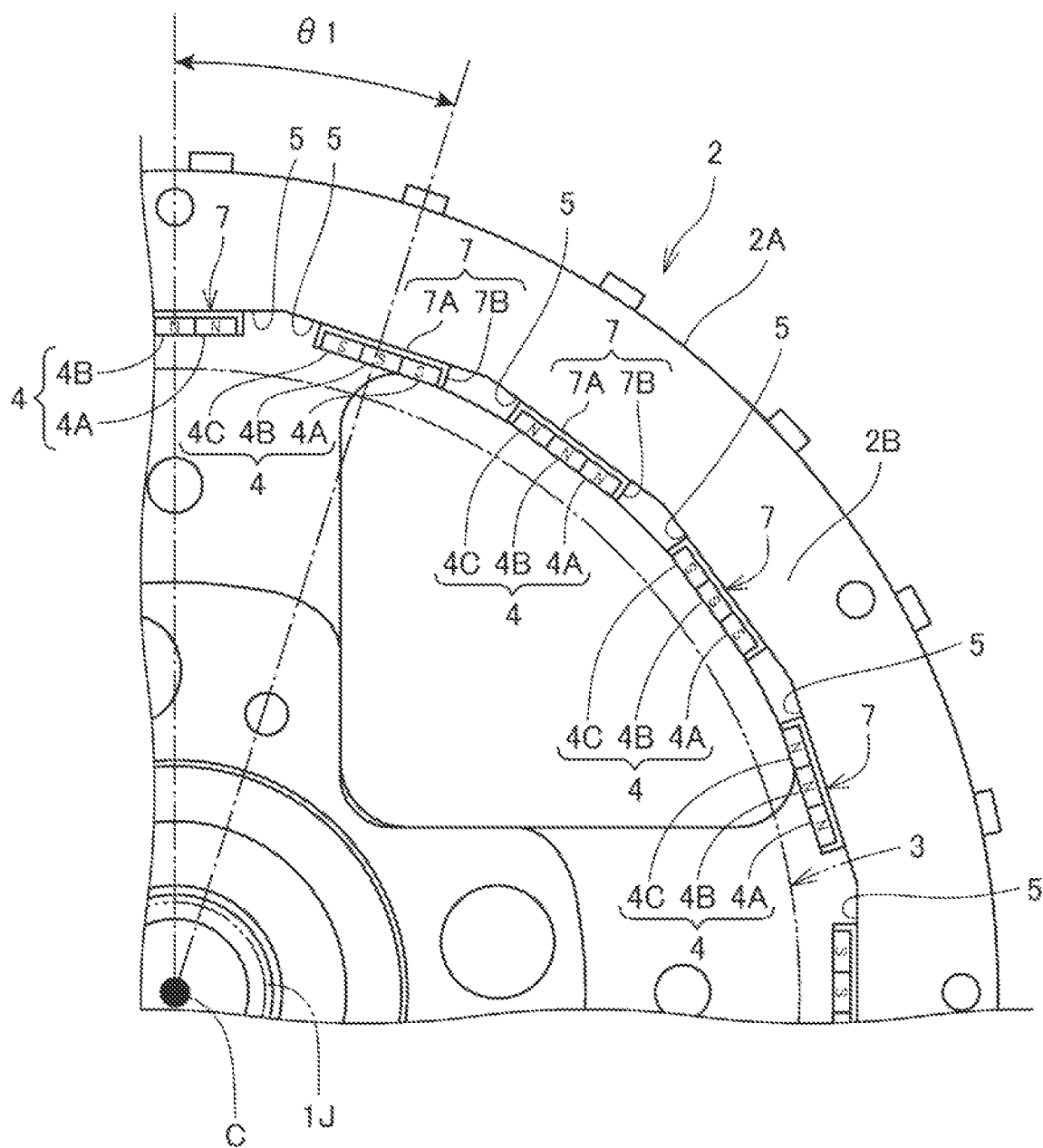
FIG. 3 is a diagram illustrating an example of a rotor using positioning members.

FIG. 3 illustrates an example of the rotor 2 using positioning members (in FIG. 3, reference numeral 7 is denoted). Each portion of the rotor 2 is the same as that illustrated in FIG. 1 except that the positioning members 7 are used.

As illustrated in FIG. 3, the positioning member 7 integrally includes a flat plate portion 7A attached to the opposing surface 5, and a side wall 7B erected around the flat plate portion 7A and surrounding the magnet 4. The positioning member 7 is formed using a resin material which is one of non-magnetic materials, and is formed by integral molding using a resin material, for example.

For joining the positioning member 7 and the opposing surface 5 and joining the positioning member 7 and the magnet 4, a method using a predetermined adhesive or a method using another joining method other than adhesion may be appropriately used.

By using the positioning members 7, the magnets 4 having various shapes including a rectangular plate shape can be easily positioned on the opposing surface 5. Since the positioning member 7 is made of resin, electromagnetic induction is not affected.

In the present embodiment, as illustrated in FIG. 3, the magnets 4 arranged on the opposing surface 5 are each configured by a plurality of (three in the present embodiment) magnet members 4A, 4B, and 4C arranged in the rotation direction of the rotor 2 in a state of being in contact with each other. Each of the magnet members 4A, 4B, and 4C has a rectangular plate shape, and has the same size, for example. Since the neodymium magnet is a metal magnet and has low electric resistance, an eddy current tends to increase, and there is a risk that the temperature becomes high due to heat generation. In the present embodiment, since the magnet 4 is constituted by a plurality of magnets in contact with each other, it is possible to appropriately increase the magnetic resistance, suppress the eddy current, and suppress the temperature rise.

According to the study of the inventors, it has been found that when the magnet 4 has a rectangular plate shape, the magnetic flux distribution has a rectangular wave, and the distortion rate of the induced voltage is deteriorated as compared with the case where the magnet 4 has a tile shape.

Figure 4A:
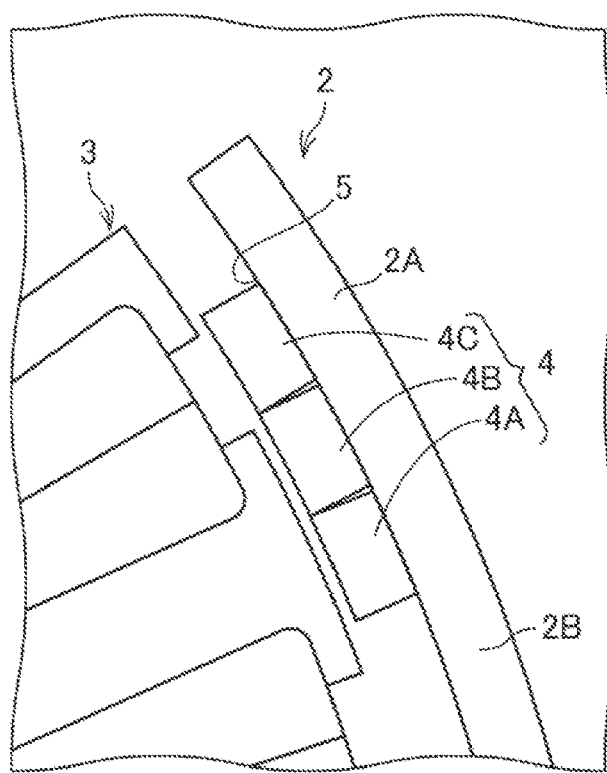
FIGS. 4A and 4B are diagrams for explaining a case where a plurality of magnet members have a rectangular plate shape and have the same magnetic flux density.
Figure 4B:
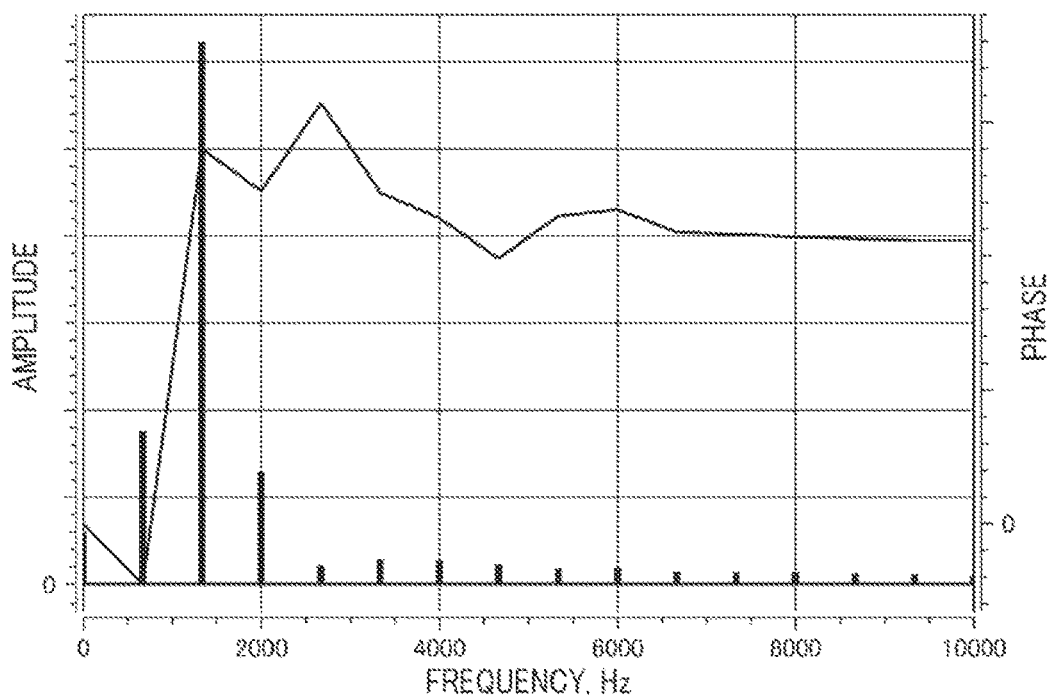

FIGS. 4A and 4B are diagrams for explaining a case where the magnet members 4A, 4B, and 4C have a rectangular plate shape and have the same magnetic flux density. Reference numeral A in FIGS. 4A and 4B schematically indicates an alternator structure to be examined, and the magnetic flux density of the magnet members 4A, 4B, and 4C is 1.4 T. Reference numeral B in FIGS. 4A and 4B indicates a fast Fourier transform (FFT) analysis result of the amplitude and the phase of the induced voltage.

From this analysis result, it is found that there is a high peak in the harmonic component around 2000 Hz, which affects the distortion rate of the induced voltage.

The inventors have found that improvement can be made by using, in the magnet 4, magnets having magnetic flux densities increased toward both ends in the rotation direction of the rotor 2.

Figure 5A:
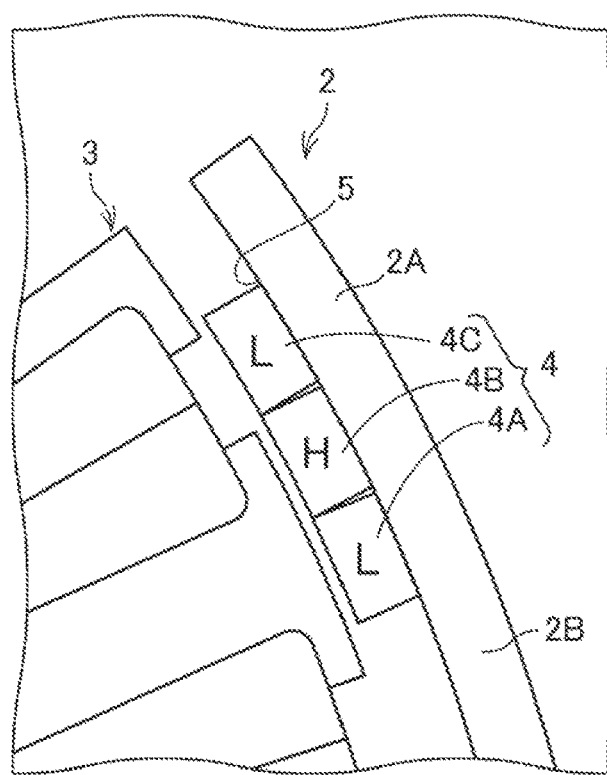
FIGS. 5A and 5B are diagrams for explaining a case where the plurality of magnet members have a rectangular plate shape, and the magnet members at both ends have a relatively low persistence density.
Figure 5B:
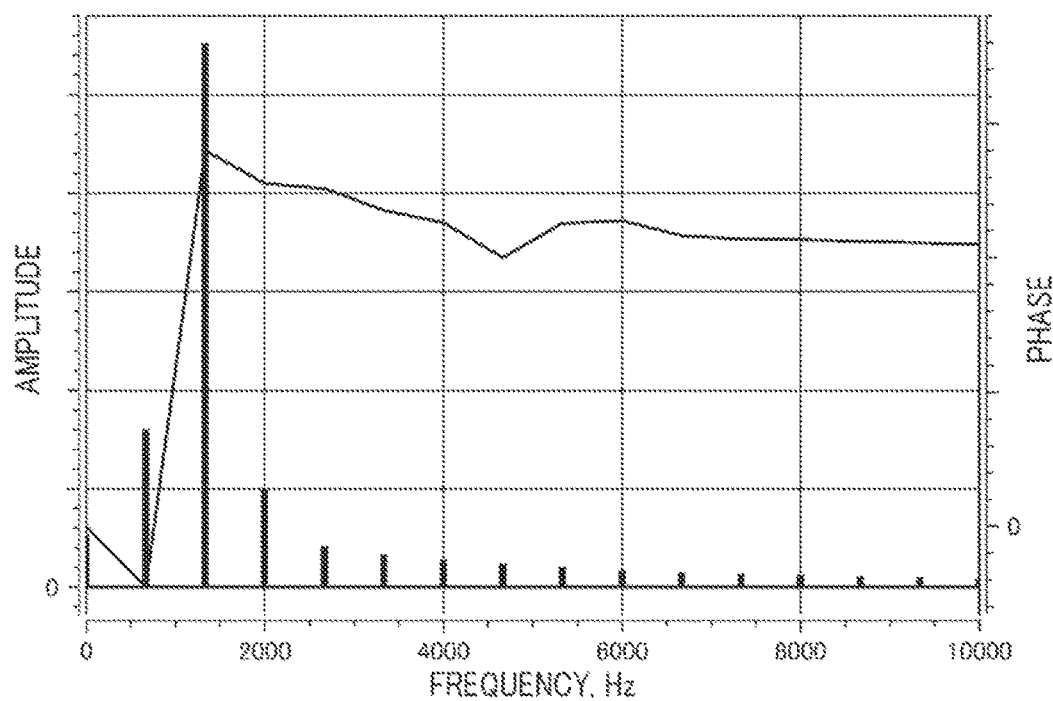

FIGS. 5A and 5B are diagrams for explaining a case where the magnet members 4A, 4B, and 4C have a rectangular plate shape, and the magnet members 4A and 4C at both ends have a relatively low persistence density. More specifically, reference numeral A in FIGS. 5A and 5B schematically indicates the alternator structure to be examined, the magnetic flux density of the magnet members 4A and 4C is 1.0 T (indicated by "L" in FIGS. 5A and 5B), and the magnetic flux density of the magnet member 4B is 1.4 T (indicated by "H" in FIGS. 5A and 5B). Reference numeral B in FIGS. 5A and 5B indicates an FFT analysis result of the amplitude and the phase of the induced voltage.

From this analysis result, it is found that there is no high peak in the harmonic component around 2000 Hz and the distortion rate of the induced voltage is improved.

The values of the magnetic flux densities of the magnet members 4A to 4C constituting the magnet 4 may be changed to appropriate values within a range in which the magnet 4 has a magnetic flux density increased toward both end sides in the rotation direction of the rotor 2. In the present embodiment, the case where the magnet 4 is divided into three magnet members 4A to 4C has been exemplified. However, the magnet 4 may be divided into four or more magnet members, or may be divided into two magnet members.

When desired characteristics such as the distortion rate of the induced voltage fall within an allowable range, the magnetic flux densities of the plurality of magnet members 4A to 4C constituting the magnet 4 may be the same.

As described above, the rotor 2 has the opposing surface 5 opposed to the stator 3, the opposing surface 5 has the flat surfaces extending in the tangential direction of the circle centered on the axial center C at a predetermined angular interval centered on the axial center C of the rotor 2, and the magnet 4 is disposed on this flat surface.

According to this configuration, the magnet 4 can be easily disposed on the rotor 2 without being processed into a tile shape or the like, and for example, adhesiveness when the magnet 4 is adhered to the rotor 2 is improved. In addition, since it is not necessary to process the magnet 4, it is also advantageous for cost reduction and defect rate reduction.

In addition, since a rare earth-based sintered magnet is used for the magnet 4, generation of swarf is eliminated as compared with a case where cutting is performed, and it is suitable for effective use of resources such as a rare earth.

In addition, the rotor 2 is opposed to the stator 3 and has a polygonal surface centered on the axial center C of the rotor 2, and the magnets 4 are arranged on this surface, so that the flat surfaces on which the magnets 4 are arranged can be easily formed.

In addition, since the magnet 4 is the neodymium magnet having a rectangular plate shape, processing from a block material in a distribution form of the neodymium magnet is minimized, and a high-performance rotating electrical machine is easily obtained.

Further, as illustrated in FIG. 3, by providing the positioning members 7 made of resin capable of positioning the magnets 4 on the opposing surface 5, the magnets 4 can be easily positioned without affecting electromagnetic induction.

As illustrated in FIGS. 5A and 5B, the magnet 4 includes the plurality of magnet members 4A to 4C arranged in the rotation direction of the rotor 2 in a state of being in contact with each other, and the magnet members 4A to 4C have magnetic flux densities decreased toward both ends in the rotation direction of the rotor 2. This makes it easy to improve the distortion rate of the induced voltage even when the magnet 4 has a rectangular plate shape. In addition, since the magnetic resistance of the magnet 4 is increased, the eddy current is suppressed, and the temperature rise is easily suppressed.

In addition, the rotor core 2A and the stator core 3A are configured by laminating a plurality of electromagnetic steel sheets having respective cross-sectional shapes of the rotor core 2A and the stator core 3A. According to this configuration, the defect rate of the rotor 2 and the stator 3 can be easily reduced, and it becomes easy to cope with the shape change of the rotor 2 and the stator 3. For example, a shape change in which a step portion capable of positioning the magnet 4 is added to the opposing surface 5 of the rotor core 2A, a design change according to required specifications, and the like are facilitated. In addition, since the electromagnetic steel sheet is used for both the rotor core 2A and the stator core 3A, the amount of heat generated by the rotor 2 and the stator 3 can be easily reduced as compared with the case where the electromagnetic steel sheet is not used.

The embodiment described above is merely an embodiment of the present invention, and can be optionally modified and applied without departing from the gist of the present invention. For example, the shapes and materials of the portions (including components) of the rotor 2 and the stator 3 may be appropriately changed. In the embodiment described above, the case where the present invention is applied to the outer rotor type rotating electrical machine has been described, but the present invention may be applied to an inner rotor type rotating electrical machine.

REFERENCE SIGNS LIST

1 Alternator (rotating electrical machine)
1J Output shaft
2 Rotor
2A Rotor core
3 Stator
3A Stator core
3B Slot
4 Magnet
4A, 4B, 4C Magnet member
5 Opposing surface
7 Positioning member
C Axial center of output shaft, rotor, and stator

What is claimed is:

1. A rotating electrical machine comprising: a stator in which a coil is disposed; and a rotor rotatable with respect to the stator,
    wherein the rotor has an opposing surface opposed to the stator,
    the opposing surface has flat surfaces extending in a tangential direction of a circle centered on an axial center of the rotor at a predetermined angular interval centered on the axial center and forms a polygonal shape centered on the axial center,
    positioning members made of resin are each attached to a respective flat surface of the flat surfaces, each of the positioning members includes a flat plate portion attached to the respective flat surface and a side wall erected around the flat plate portion, and
    magnets are each disposed inside a respective positioning member of the positioning members, each of the magnets being enclosed by the side wall and joined to the flat plate portion of the respective positioning member, each of the magnets is configured by a plurality of magnet members arranged in a rotation direction of the rotor in a state of being adjacent magnet members being in contact with each other, and each of the plurality of magnet members has a rectangular plate shape and is a rare earth-based sintered magnet.

2. The rotating electrical machine according to claim 1, wherein the plurality of magnet members are neodymium magnets.

3. The rotating electrical machine according to claim 1, wherein
    the plurality of magnet members constituting each of the magnets have magnetic flux densities that decrease towards both ends in the rotation direction of the rotor such that magnet members, of the plurality of magnet members, disposed away from a magnet member, of the plurality of magnet members, disposed at a center of the magnet have lower magnetic flux densities that the magnet member, of the plurality of magnet members, disposed at the center of the magnet.

4. The rotating electrical machine according to claim 1, wherein a rotor core of the rotor and a stator core of the stator are formed by laminating a plurality of electromagnetic steel sheets.

* * * * *